(12) United States Patent
Clifton et al.

(10) Patent No.: US 9,575,660 B2
(45) Date of Patent: Feb. 21, 2017

(54) FLEXIBLY STORING DEFINED PRESETS FOR CONFIGURATION OF STORAGE CONTROLLER

(71) Applicant: INTERNATIONAL BUSINESS MACHINES CORPORATION, Armonk, NY (US)

(72) Inventors: John M. Clifton, Hertford Heath (GB); Matthew J. Fairhurst, Winchester (GB); Colin R. Jewell, Chandler's Ford (GB); James Mulcahy, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/215,189

(22) Filed: Mar. 17, 2014

(65) Prior Publication Data

US 2014/0304484 A1 Oct. 9, 2014

(30) Foreign Application Priority Data

Apr. 3, 2013 (GB) .................................. 1305978.7

(51) Int. Cl.
*G06F 3/06* (2006.01)
*G06F 9/445* (2006.01)

(52) U.S. Cl.
CPC ........... *G06F 3/0605* (2013.01); *G06F 3/0632* (2013.01); *G06F 3/0674* (2013.01); *G06F 9/44505* (2013.01); *G06F 3/0664* (2013.01)

(58) Field of Classification Search
None
See application file for complete search history.

(56) References Cited

U.S. PATENT DOCUMENTS

| | | | |
|---|---|---|---|
| 6,538,669 B1 | 3/2003 | Lagueux et al. | |
| 6,567,774 B1 | 5/2003 | Lee et al. | |
| 7,054,924 B1 * | 5/2006 | Harvey | H04L 67/303 709/203 |
| 7,822,894 B2 | 10/2010 | Harima et al. | |

(Continued)

FOREIGN PATENT DOCUMENTS

| | | |
|---|---|---|
| CN | 102455915 A | 5/2012 |
| EP | 2372519 A2 | 10/2012 |

OTHER PUBLICATIONS

SAN Volume Controller: Software Installation and Configuration Guide.

(Continued)

*Primary Examiner* — Midys Rojas
*Assistant Examiner* — Leandro Villanueva
(74) *Attorney, Agent, or Firm* — Matthew C. Zehrer (57) ABSTRACT

Storing defined presets for configuration of a storage controller may include providing a storage controller interface to define a preset associated with an action of the storage controller; receiving preset parameter values for the preset via the interface; validating the preset parameter values to check that the preset is valid; storing the preset within the storage controller, and creating one or more preset objects from the preset, the preset object being accessible by the storage controller at run time. The preset may include a human-readable name; an action name indicating to which associated storage controller action the preset applies, and a set of parameter name-value pairs.

20 Claims, 5 Drawing Sheets

(56) References Cited

U.S. PATENT DOCUMENTS

| | | | |
|---|---|---|---|
| 8,205,014 B2 | 6/2012 | Onuki | |
| 8,225,039 B2 | 7/2012 | Kawaguchi et al. | |
| 8,874,755 B1* | 10/2014 | Deklich | G06F 3/0484 709/220 |
| 2004/0031030 A1* | 2/2004 | Kidder | G06F 1/14 717/172 |
| 2004/0254953 A1* | 12/2004 | Vincent, III | G06F 17/2247 |
| 2007/0061428 A1* | 3/2007 | Haley | G06F 17/30893 709/220 |
| 2008/0163171 A1 | 7/2008 | Chess et al. | |
| 2009/0319747 A1 | 12/2009 | Jibbe et al. | |
| 2010/0169629 A1 | 7/2010 | Zhang et al. | |
| 2010/0268803 A1* | 10/2010 | Calippee | H04L 41/0843 709/221 |
| 2011/0276794 A1 | 11/2011 | Yamaguchi | |
| 2013/0198349 A1* | 8/2013 | Wright | H04L 41/0883 709/221 |

OTHER PUBLICATIONS

Performance Benefits of IBM Storwize V7000 With Ibm Easy Tier for Oracle Asm.

* cited by examiner

FLEXIBLY STORING DEFINED PRESETS FOR CONFIGURATION OF STORAGE CONTROLLER

FIELD

Embodiments of the present invention relate to the field of configuration of a storage device controller or storage system controller. In particular, embodiments of the invention relate to flexibly storing defined presets for configuration of a storage controller.

DESCRIPTION OF THE RELATED ART

Configuring a large system such as a storage controller is complex and requires the creation and association of a large number of properties, each with a large set of configurable options. It requires a large amount of knowledge of the system being set up and also of the way in which each object is expected to be used.

For instance, in a typical Storage Area Network (SAN) Volume Controller system, one might create 8000 virtual disks. Each virtual disk (vdisk) can have somewhere in the region of 20 different properties associated therewith. Some exemplary properties of a particular vdisk may be the reported size of the vdisk reported to a user, the actual physical storage size allocated to the vdisk, whether the vdisk automatically expands as space is used, when the vdisk or the controller system should warn the user that the vdisk is getting full, etc.

The task of setting or implementing these properties is difficult and time consuming for the user and the consequences of getting it wrong can be business critical. Therefore, there is a need in the art to address the aforementioned problems.

SUMMARY

In a first embodiment of the present invention, a method for storing defined presets for configuration of a storage controller includes: providing a storage controller interface to define a preset associated with an action of the storage controller; receiving preset parameter values for the preset via the interface; validating the preset parameter values to check that the preset is valid; storing the preset within the storage controller, and creating one or more preset objects from the preset, the preset object being accessible by the storage controller at run time.

In certain embodiments, the method may further include: detecting an input action of the received preset parameter values for the preset; locating a definition of the input action, and using a validation code associated with the input action to validate the received preset parameter values.

In certain embodiments, the method may further include: modifying parameter values associated with the one or more preset objects and re-validating the parameter values to check that the preset is still valid.

In certain embodiments, the method may further include: merging at least two preset objects associated with the same storage controller action by creating one or more combined parameter value lists with defined control of a dominant preset object; tagging the one or more created preset objects so that a change in the preset can be passed to the one or more preset objects created from the preset; and/or creating a new preset object based on an pre existing preset object by querying the preset parameter values of the pre existing preset and creating the new preset object from the pre existing preset.

In another embodiment of the present invention, a system for storing defined presets for configuration of a storage controller includes: a storage controller preset setup component, a storage controller preset validation component, a storage controller memory component, and a storage controller preset object creating component. The storage controller preset setup component provides a storage controller interface to define a preset associated with an action of the storage controller and receives preset parameter values for the preset via the interface. The storage controller preset validation component validates the received parameter values as part of the preset creation to check that the preset is valid. The storage controller memory component stores the preset within the storage controller. The storage controller preset object component creates one or more preset objects from the preset, the preset object being accessible by the storage controller at run time.

In certain embodiments the system further includes a storage controller preset edit component, a storage controller preset merge component, and a storage controller tag and update component. The storage controller preset edit component updates the one or more preset objects when upgrading the storage controller software. The storage controller preset merge component merges two or more presets for the same action by combining their parameter lists with defined control of the dominance of one of the preset objects. The storage controller tag and update component persistently tags object instances created with a preset so that a change in the preset can be passed to an object created from the preset.

In certain embodiments, the storage controller preset edit component may modify preset parameters associated with the one or more preset objects and/or the storage controller preset validation component may re-validate the parameter values to check that the modified parameter values of the preset are valid.

In certain embodiments, the storage controller preset object creating component may create the one or more preset objects based on an existing preset object by querying the preset parameter values of the pre existing preset and creating the new preset object from the pre existing preset. The storage controller preset setup component may receive parameter values as a sub-set of preset parameters and may create additional preset parameters for the creation of the preset object.

In another embodiment, a computer program product for storing defined presets for configuration of a storage controller includes a computer readable storage medium having program instructions embodied therewith. The program instructions are readable by a processor to cause the processor to: provide a storage controller interface to define a preset associated with an action of the storage controller; receive preset parameter values for the preset via the interface; validate the preset parameter values to check that the preset is valid; store the preset within the storage controller, and create one or more preset objects from the preset, the preset object being accessible by the storage controller at run time.

In certain embodiment, the program instructions readable by a processor may further cause the processor to: modify parameter values associated with the one or more preset objects; re-validate the parameter values to check that the preset is still valid; merge at least two preset objects associated with the same storage controller action by creating one or more combined parameter value lists with defined control of a dominant preset object; tag the one or more created preset objects so that a change in the preset can be passed to the one or more preset objects created from the preset, and/or create a new preset object based on an pre existing preset object by querying the preset parameter values of the pre existing preset and creating the new preset object from the pre existing preset.

In various embodiments the preset may include a human-readable name; an action name indicating to which associated storage controller action the preset applies, and a set of parameter name-value pairs.

In various embodiments the one or more created preset objects each comprise a plurality of key pairs of parameter values, wherein the key pairs are stored in alphabetical order.

In various embodiments the one or more preset objects may be updated if the storage controller's software is upgraded.

The described embodiments of the invention provide the advantage of rather than have a user remember all the device's settings and the preferred values, it allows them to create presets which can be given a human comprehensible name and then used repeatedly to create a complex system that complies with business goals.

BRIEF DESCRIPTION OF THE DRAWINGS

The subject matter of one or more embodiments of the present invention is particularly pointed out and distinctly claimed in the concluding portion of the specification. The embodiments of the invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the embodiments of the present invention may be practiced without these specific details. In other instances, well-known methods, procedures, and components have not been described in detail so as not to obscure the various embodiments.

Methods and systems are provided for flexibly storing defined presets (which may also be referred to as templates) for configuration of a storage controller. A preset is an object that contains a list of parameters together with values for each parameter. Presents may be stored within the running storage system's memory as an object so that code can access it at run time.

For instance, rather than have a user remember all the system's settings and their preferred value, the user may create presets which can be given a human comprehensible name and then used repeatedly to create a complex system. The preset may be stored in the system as an object so the system may allow the user to perform associated actions on/with each preset.

The preset may include a human-meaningful or human-readable name, an action, and a set of parameter name-value pairs. The human-meaningful or human-readable name is the name of the preset and is used by humans to understand what the preset is for. The action indicates to which action in the system's configuration interface the preset applies. The action defines the object type to which the action applies and which parameters may be specified by the preset. This lets a user request an action using the human-readable name preset without having to remember or guess at the preferred values for the action.

In general, configuration objects have several settings which tune the behaviour of the object to satisfy particular user/business needs. The system cannot know in advance what the right values for these settings are and so relies on the user choosing the right values. For example, such actions may include setting up a vdisk, setting up a RAID array configuration, a disaster recovery strategy for a volume/set of volumes, etc.

In a described example, the action may be to request a new vdisk and the parameter values may be stored as the following preset: mkpreset -presetname AIXVdisk -cli mkvdisk--params size=100, autoexpand=true, name=vdisk# etc. (Here # would be interpreted as add the next lowest unused number on the end of the name; each run of this preset would then create vdisk0, vdisk1, etc.).

In this example, the preset includes the following: the human-readable name is "AIXVdisk"; the action is "mkvdisk" which indicates to which action in the system's configuration interface the preset applies; and the set of parameter pairs are {(size, 100), (autoexpand, true), (name, vdisk#)}.

Figure 1:
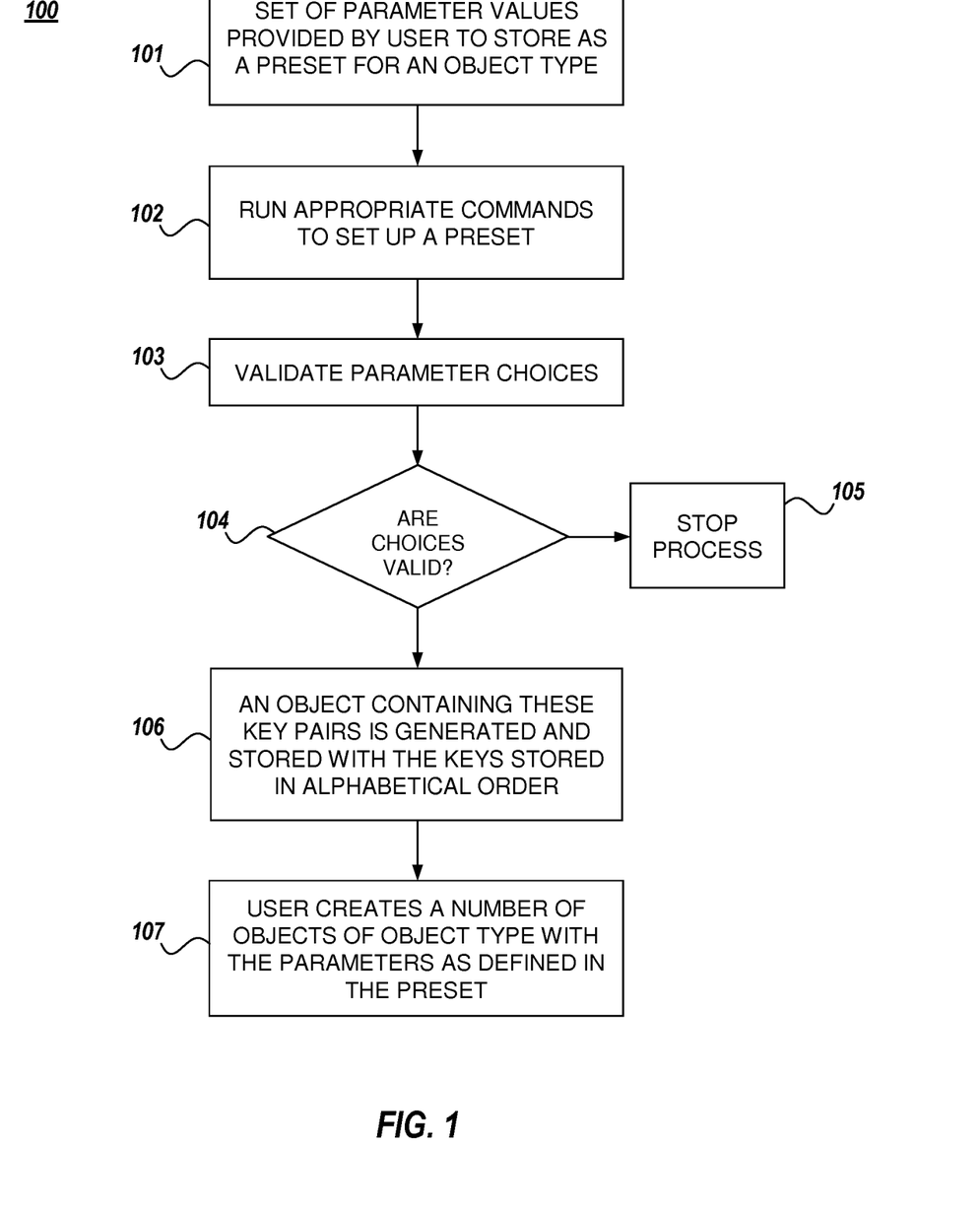
FIG. 1 is a flow diagram of an example embodiment of a method in accordance with the present invention.

Referring to FIG. 1, a flow diagram 100 shows a basic case for creating a preset which is described for clarity. More complex versions may use the same approach; however, the process may be more complex.

A user may provide a set of parameter values that they want to store as a preset for an object type (block 101). In certain embodiments, the user may also provide the human-readable name for the preset. The user may run appropriate commands to set up this preset (block 102). The system may validate the parameter choices using the checking that would be run if this object type create command was being run normally (block 103). It may then be determined if the choices are valid (block 104). If they are not valid, the process may end at block 105.

If the parameter choices pass the validation at block 104, an object containing these key value pairs may be created and stored referenced by the human-readable name set by the user (block 106). In an embodiment, the keys may be stored in alphabetical order to make searching the object later to merge/edit/etc. easier. The user may create a number of the object types with the parameters as defined in the preset (block 107). For example, the user may then decide to create fifty of the object types (vdisks in an exemplary embodiment) using the following preset: mkvdisk -preset AIXVdisk -count 50. The system may then create 50 vdisks with the parameters defined in the preset.

The advantages of this approach include a small memory footprint as the preset is stored as an object, therefore, all the normal techniques to make it as small as possible may be employed. Another advantage over preset scripts stored externally to the storage controller is that, when the storage controller firmware is upgraded, the storage controller itself can validate that the presets remain valid. The preset may be automatically be modified or an error may be logged and the preset deleted if an issue were found. A further advantage is that there is a high ease of implementation.

Figure 2:
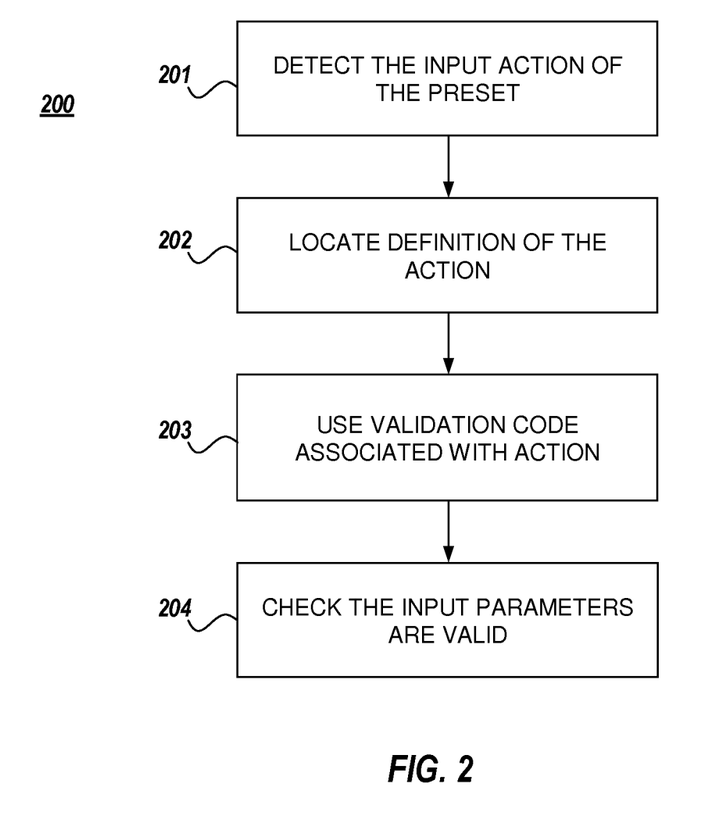
FIG. 2 is a flow diagram of an example embodiment of an aspect of a method in accordance with the present invention.

Referring to FIG. 2, a flow diagram 200 shows an exemplary implementation of a method of defining a new preset. The system may detect the input action of the preset (block 201) and may locate the definition of that action (block 202). The system may then use the validation code associated with the action (block 203) to validate that the input parameters are valid (block 204).

For example, when defining a new preset, using the command "mkpreset -presetname AIXVdisk -cli mkvdisk -params size=100, autoexpand=true", rather than having to write bespoke code for every object type, the code may grab the "cli" parameter from the mkpreset command. The code may look up the "cli" ("mkvdisk") internally and use the, already written and functioning, validation code associated with that "cli" to check that the parameter list supplied is valid. This one piece of code would then allow presets to be used on any "cli" with no extra effort.

The following extensions are possible with the described method and system:

Edit Preset: The user may modify/add parameters in a preset very easily and because the object is stored internally, it may be automatically re-validated to check that the new preset values are valid and consistent.

Merge: Two or more presets for the same action may be combined by merging their parameter lists. Rules may need to be put in place for clashes (for example, assigning one preset as the priority who wins if a clashing parameter is found). Again, the internal validation may be immediately run to check that the preset is still valid and self-consistent.

Tag and Auto-Update: Each object created with a particular preset may be optionally tagged so that if the preset parameter values are subsequently updated, all such objects may also be updated. An example when this might be useful is if business rules change to make all "vdisks" have the parameter "autoexpand" set to false instead of true—by changing the preset value of the "autoexpand" parameter, all objects created with that preset automatically update to follow the new business rules.

Create Preset From Existing Object: Since the preset includes a set of object parameter values, it can be seen that adding a 'create a preset based on this object' could be done with little effort by querying the object in question and storing its values.

Hierarchical Links: Multiple presets may be linked together in a hierarchy in such a way that the user could define a 'system' that contained links to other presets for the objects within a system. Then a single call to "mksystem"-preset could cause a whole system and all its associated sub-components to be created.

Incomplete Presets: In certain embodiments there is no reason for the user to specify values for all possible parameters as they may only specify those that do not change often. At the point at which the preset is used, the remaining parameters may be specified and in fact parameters in the preset could be overwritten in the same way. For example, mkvdisk -preset, AIXVdisk -size 20.

Figure 3:
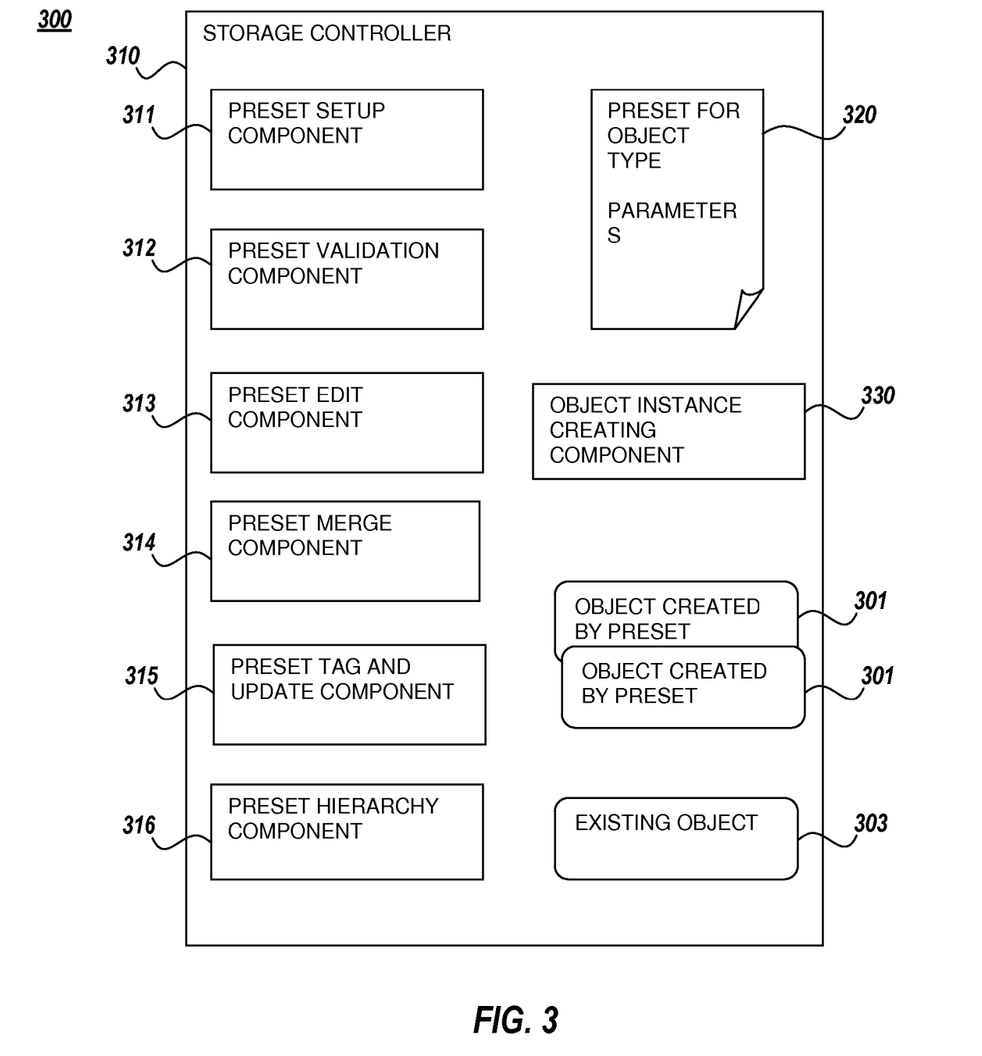
FIG. 3 is block diagram of an example embodiment of a system in accordance with the present invention.

Referring to FIG. 3, a block diagram shows an example embodiment of the described system 300. A storage controller 310 is provided which includes a preset setup component 311 providing functionality for a user to set up a preset 320 in the storage controller for an object. Having a storage controller 310 with a function for provisioning objects using presets built-in, enables many features which are not possible with the prior art where such functions are provided in a layer above the controller.

The preset setup component 311 may enable a user to provide a set of parameter values to be stored as a preset for an object type. An object instance creating component 330 may be provided for creating object instances 301, 302 of the object type by the user using the preset 320. The preset setup component 311 may also enable a preset 320 to be created from an existing object 303 by querying the object 303 and storing its values as a new preset 320 for the object type.

A preset validation component 312 may be provided for validating the parameters provided by a user by using checking that would be run if the preset action was being run normally. The preset validation component 312 enables validation as part of the preset creation including the actual semantics and state of the controller.

A preset edit component 313 may be provided for modifying parameters in a preset. Any modification may require the preset validation component 312 to re-validate the new preset values. The preset edit component 313 may be used to update preset objects when the storage controller software is upgraded.

A preset merge component 314 may be provided for combining two or more presets. The preset merge component 314 may include rules to handle any clashes when merging. A preset tag and update component 315 may be provided to optionally tag all objects created with a particular preset so that they may be updated if the preset is updated. The preset tag and update component 315 may enable persistent tagging of objects created with a preset so that a change in the preset may affect all objects created from it. A preset hierarchy component 316 may be provided enabling multiple presets to be linked together in a hierarchy enabling a user to create a set of object linked in a hierarchy.

Figure 4:
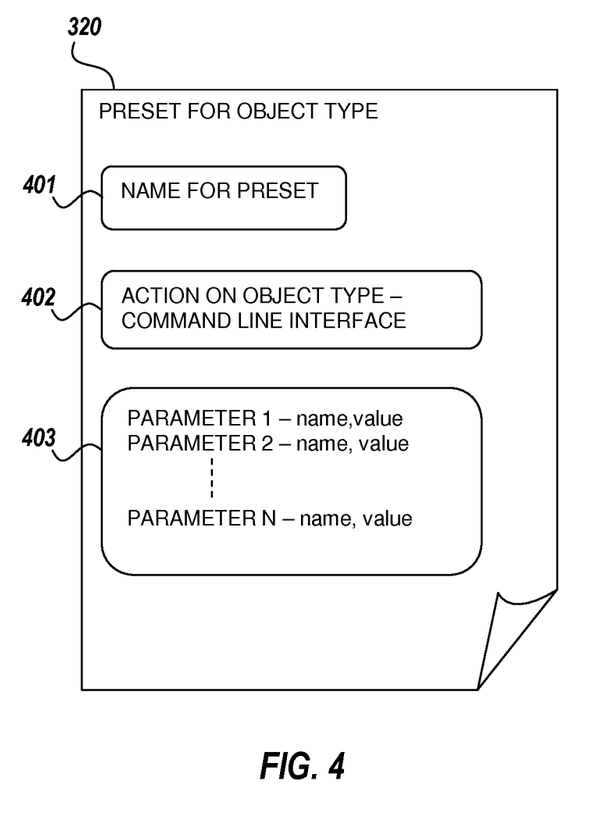
FIG. 4 is a schematic diagram showing a preset in accordance with the present invention.

Referring to FIG. 4, a schematic diagram shows a preset object 320. The preset object 320 may include a human-readable name 401 for the preset, an action 402 identifying action in the configuration interface on an object type to which the preset applies. The preset 320 may also include one or more parameters 403 as name-value pairs for the object to be created by the action.

Figure 5:
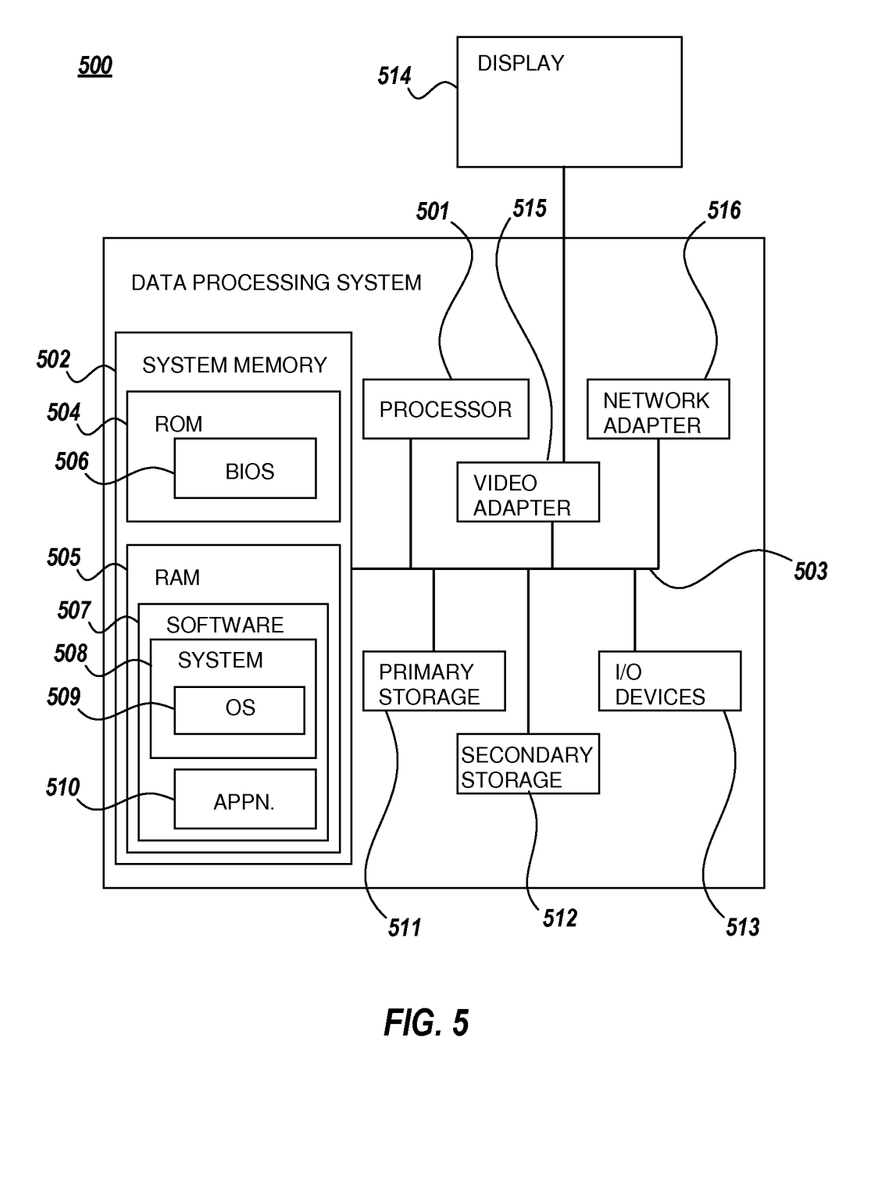
FIG. 5 is a block diagram of an exemplary computer system in which one or more embodiments of the present invention may be embodied or implemented.

Referring to FIG. 5, an exemplary system for implementing or embodying the various of the invention is depicted. The system may include a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage medium 511 such as a magnetic hard disk drive and secondary storage medium 512 such as a magnetic disc drive and an optical disc drive. The drives and their associated computer-readable media provide non-volatile storage of computer-executable instructions, data structures, program modules and other data for the system 500. Software applications may be stored on the primary and secondary storage mediums 511, 512 as well as the system memory 502.

The computing system 500 may operate in a networked environment using logical connections to one or more remote computers via a network adapter 516. Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

An alternative to storing an object within the system is to use environment variables to store the key, value pairs. The disadvantage of this is that reading environment variables at run time is inefficient and gives less flexibility when it comes to manipulating presets programmatically.

Another alternative is to store a 'sample' command as a string and just re-use that each time. One disadvantage of this is that strings take up a lot of memory compared to an object (struct/class/hash table depending on implementation) as described herein. Another disadvantage is that it would be necessary to parse the string every time a user wanted to do anything like modify/merge/extend a preset which is less efficient than the described approach.

The embodiments of invention may take the form of an entirely hardware embodiment, an entirely software embodiment or an embodiment containing both hardware and software elements. In a preferred embodiment, the invention is implemented in software, which includes but is not limited to firmware, resident software, microcode, etc. stored on a computer readable storage medium.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The computer readable storage medium is a tangible electronic, magnetic, optical, electromagnetic, infrared, or semiconductor system, apparatus or device. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. The computer readable storage medium is not a propagation medium such as a carrier wave.

Improvements and modifications can be made to the foregoing without departing from the scope of the present invention.

The invention claimed is:

1. A method for storing defined presets for configuration of a storage controller, comprising:
   providing a storage controller interface to define a preset associated with an action of the storage controller;
   receiving preset parameter values for the preset via the interface;
   validating the preset parameter values to check that the preset is valid;
   storing the preset within the storage controller, and;
   creating one or more preset objects within the storage controller from the preset, the preset object being accessible by the storage controller at run time, wherein a first preset object is a virtual disk upon one or more disk drives within the storage controller, and
   wherein the preset comprises: a human-readable name, an action name indicating to which associated storage controller action the preset applies, and a set of parameter name-value pairs stored in alphabetical order, wherein a first name-value pair specifies a size key and size value of the virtual disk and a second name-value pair specifies a name key and name value of the virtual disk.

2. The method of claim 1, further comprising:
   detecting an input action of the received preset parameter values for the preset;
   locating a definition of the input action, and;
   using a validation code associated with the input action to validate the received preset parameter values.

3. The method of claim 1, wherein the one or more created preset objects each comprise a plurality of key pairs of parameter values, wherein the key pairs are stored in alphabetical order.

4. The method of claim 1, further comprising:
   updating the one or more preset objects if the storage controller's software is upgraded.

5. The method of claim 1, further comprising:
   modifying parameter values associated with the one or more preset objects; and
   re-validating the parameter values to check that the preset is still valid.

6. The method of claim 1, further comprising:
   merging at least two preset objects associated with the same storage controller action by creating one or more combined parameter value lists with defined control of a dominant preset object.

7. The method of claim 1, further comprising:
   tagging the one or more created preset objects so that a change in the preset can be passed to the one or more preset objects created from the preset.

8. The method of claim 1, further comprising:
   creating a new preset object based on an pre existing preset object by querying the preset parameter values of the pre existing preset and creating the new preset object from the pre existing preset.

9. A system for storing defined presets for configuration of a storage controller, comprising:
   a storage controller preset setup component for providing a storage controller interface to define a preset associated with an action of the storage controller, and for receiving preset parameter values for the preset via the interface;

a storage controller preset validation component for validating the received parameter values as part of the preset creation to check that the preset is valid;
a storage controller memory component for storing the preset within the storage controller, and;
a storage controller preset object creating component for creating one or more preset objects within the storage controller from the preset, the preset object being accessible by the storage controller at run time, wherein a first preset object is a virtual disk upon one or more disk drives within the storage controller, and
wherein the preset comprises: a human-readable name, an action name indicating to which associated storage controller action the preset applies, and a set of parameter name-value pairs stored in alphabetical order, wherein a first name-value pair specifies a size key and size value of the virtual disk and a second name-value pair specifies a name key and name value of the virtual disk.

10. The system as claimed in claim 9, wherein the one or more created preset objects each comprise a plurality of key pairs of parameter values, wherein the key pairs are stored in alphabetical order.

11. The system as claimed in claim 9, further comprising:
a storage controller preset edit component for updating the one or more preset objects when upgrading the storage controller software;
a storage controller preset merge component for merging two or more presets for the same action by combining their parameter lists with defined control of the dominance of one of the preset objects, and;
a storage controller tag and update component for persistent tagging of object instances created with a preset so that a change in the preset can be passed to an object created from the preset.

12. The system as claimed in claim 11, wherein the storage controller preset edit component modifies preset parameters associated with the one or more preset objects; and wherein the storage controller preset validation component re-validates the parameter values to check that the modified parameter values of the preset are valid.

13. The system as claimed in claim 9, wherein the storage controller preset object creating component creates the one or more preset objects based on an existing preset object by querying the preset parameter values of the pre existing preset and creating the new preset object from the pre existing preset; and wherein the storage controller preset setup component receives parameter values as a sub-set of preset parameters and creates additional preset parameters for the creation of the preset object.

14. A computer program product for storing defined presets for configuration of a storage controller, the computer program product comprising a computer readable storage medium having program instructions embodied therewith, the program instructions readable by a processor to cause the processor to:
provide a storage controller interface to define a preset associated with an action of the storage controller;
receive preset parameter values for the preset via the interface;
validate the preset parameter values to check that the preset is valid;
store the preset within the storage controller, and;
create one or more preset objects within the storage controller from the preset, the preset object being accessible by the storage controller at run time, wherein a first preset object is a virtual disk upon one or more disk drives within the storage controller, and
wherein the preset comprises: a human-readable name, an action name indicating to which associated storage controller action the preset applies, and a set of parameter name-value pairs stored in alphabetical order, wherein a first name-value pair specifies a size key and size value of the virtual disk and a second name-value pair specifies a name key and name value of the virtual disk.

15. The computer program product of claim 14, wherein the program instructions readable by a processor further cause the processor to:
detect an input action of the received preset parameter values for the preset;
locate a definition of the input action, and;
use a validation code associated with the input action to validate the received preset parameter values.

16. The computer program product of claim 14, wherein the one or more created preset objects each comprise a plurality of key pairs of parameter values, wherein the key pairs are stored in alphabetical order.

17. The computer program product of claim 14, wherein the program instructions readable by a processor further cause the processor to:
modify parameter values associated with the one or more preset objects;
re-validate the parameter values to check that the preset is still valid;
merge at least two preset objects associated with the same storage controller action by creating one or more combined parameter value lists with defined control of a dominant preset object;
tag the one or more created preset objects so that a change in the preset can be passed to the one or more preset objects created from the preset, and;
create a new preset object based on an pre existing preset object by querying the preset parameter values of the pre existing preset and creating the new preset object from the pre existing preset.

18. The method of claim 1, wherein a second preset object is a volume configuration upon redundant array of independent disks (RAID) within the storage controller.

19. The system as claimed in claim 9, wherein a second preset object is a volume configuration upon redundant array of independent disks (RAID) within the storage controller.

20. The computer program product of claim 14, wherein a second preset object is a volume configuration upon redundant array of independent disks (RAID) within the storage controller.

* * * * *